US012620686B2

(12) United States Patent
Yasuda et al.

(10) Patent No.: US 12,620,686 B2
(45) Date of Patent: May 5, 2026

(54) METALENS

(71) Applicant: FUJIFILM Corporation, Tokyo (JP)

(72) Inventors: Hideki Yasuda, Kanagawa (JP); Yukito Saitoh, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 99 days.

(21) Appl. No.: 18/894,769

(22) Filed: Sep. 24, 2024

(65) Prior Publication Data

US 2025/0015474 A1     Jan. 9, 2025

Related U.S. Application Data

(63) Continuation of application No. PCT/JP2023/011398, filed on Mar. 23, 2023.

(30) Foreign Application Priority Data

Mar. 29, 2022     (JP) ................................. 2022-053533

(51) Int. Cl.
     *H01P 3/20*          (2006.01)
     *B82Y 20/00*         (2011.01)
     *B82Y 30/00*         (2011.01)
(52) U.S. Cl.
     CPC ................ *H01P 3/20* (2013.01); *B82Y 20/00* (2013.01); *B82Y 30/00* (2013.01)
(58) Field of Classification Search
     CPC ........... H01P 3/20; B82Y 20/00; B82Y 30/00; H01Q 15/08; H01Q 15/10
     (Continued)

(56) References Cited

U.S. PATENT DOCUMENTS

| | | | | |
|---|---|---|---|---|
| 9,812,786 B2 * | 11/2017 | Foo | ................... | H01Q 15/0026 |
| 2016/0028142 A1 | 1/2016 | Suzuki | | |
| 2017/0062945 A1 | 3/2017 | Foo | | |

FOREIGN PATENT DOCUMENTS

| | | |
|---|---|---|
| EP | 3179297 A1 | 6/2017 |
| JP | 2009-266900 A | 11/2009 |

(Continued)

OTHER PUBLICATIONS

International Search Report issued in PCT/JP2023/011398 on Jun. 13, 2023.

(Continued)

*Primary Examiner* — Jorge L Salazar, Jr.
(74) *Attorney, Agent, or Firm* — Edwards Neils LLC; Jean C. Edwards, Esq.

(57)     ABSTRACT

A metalens capable of concentrating terahertz waves having a high light concentration efficiency. The metalens includes a first region that has a plurality of microstructures disposed therein to concentrate terahertz waves; and a second region that is a region that surrounds the first region and that is a region different from the first region, in which in a case where terahertz waves having a wavelength of 0.3 mm, a wavelength of 1 mm, and a wavelength of 3 mm are incident, assuming that a wavelength having a highest light concentration efficiency is a wavelength X, a transmittance of the terahertz waves having the wavelength X in the first region is a transmittance T1, and a transmittance of the terahertz waves having the wavelength X in the second region is a transmittance T2, the transmittance T2 is lower than the transmittance T1.

10 Claims, 6 Drawing Sheets

(58) Field of Classification Search
USPC ......... 333/20, 125, 126, 128, 134, 135, 136,
333/137, 156–161
See application file for complete search history.

(56) References Cited

FOREIGN PATENT DOCUMENTS

| | | |
|---|---|---|
| JP | 2011-028132 A | 2/2011 |
| JP | 2018-529278 A | 10/2018 |
| WO | 2014/142294 A1 | 9/2014 |

OTHER PUBLICATIONS

Written Opinion issued in PCT/JP2023/011398 on Jun. 13, 2023.
International Preliminary Report on Patentability completed by
WIPO on Sep. 24, 2024 in connection with International Patent
Application No. PCT/JP2023/011398.
Takehito Suzuki et al., Metalens Mounted on a Resonant Tunneling
Diode for Collimated and Directed Terahertz Waves, Optics Express,
Jun. 2021, 18988-19000, vol. 29, No. 12/7, Japan.

* cited by examiner

1

METALENS

CROSS-REFERENCE TO RELATED APPLICATIONS

This application is a Continuation of PCT International Application No. PCT/JP2023/011398 filed on Mar. 23, 2023, which was published under PCT Article 21(2) in Japanese, and which claims priority under 35 U.S.C. § 119 (a) to Japanese Patent Application No. 2022-053533 filed on Mar. 29, 2022. The above applications are hereby expressly incorporated by reference, in their entirety, into the present application.

BACKGROUND OF THE INVENTION

1. Field of the Invention

The present invention relates to a metalens using a metasurface structure.

2. Description of the Related Art

The metalens is an optical element capable of realizing a lens function such as light concentration and collimation in a substantially flat plate shape by imparting desired phase characteristics to transmitted waves.

Such a metalens is usually configured by arrangement of microstructures formed of a metal or a dielectric substance, which is provided on a flat plate.

A 6G communication system (sixth-generation mobile communication system) has been attracting attention as a next-generation communication standard of a 5G communication system (fifth-generation mobile communication system).

In the 6G communication system, electromagnetic waves of so-called terahertz waves (terahertz band) are used for communication. In order to control the terahertz waves with a normal lens made of glass or the like, it is necessary to use an extremely thick dome-like lens. In consideration of a size of the communication system or the like, it is preferable that the optical element used in the system is thin.

Therefore, in the 6G communication system, a metalens that can be implemented by an optical element having a substantially flat plate shape has been attracting attention as an optical element for concentrating and collimating the terahertz waves.

For example, a metalens, which collimates diffusive terahertz waves emitted from a resonant tunneling diode, is described in "Metalens mounted on a resonant tunneling diode for collimated and directed terahertz waves" Takehito Suzuki et al. Vol. 29, No. 12/7 Jun. 2021/Optics Express 18988.

The metalens is formed by symmetrically arranging microstructures consisting of metal wires on both surfaces of a substrate made of a dielectric substance such as a cycloolefin polymer.

SUMMARY OF THE INVENTION

As described in "Metalens mounted on a resonant tunneling diode for collimated and directed terahertz waves" Takehito Suzuki et al. Vol. 29, No. 12/7 Jun. 2021/Optics Express 18988, the metalens is able to concentrate and collimate terahertz waves by a thin optical element having a flat plate shape.

However, according to the studies by the present inventors, there is a problem in that a metalens that concentrates terahertz waves has a lower light concentration efficiency than a lens that concentrates visible light.

An object of the present invention is to solve the above-mentioned problem of the related art and to provide a metalens corresponding to terahertz waves, the metalens having a high light concentration efficiency in a case where the terahertz waves are incident.

In order to solve the above-mentioned problem, the present invention has the following configurations.

[1] A metalens according to an aspect of the present invention comprises:

a first region that has a plurality of microstructures disposed therein to diffract and concentrate terahertz waves; and a second region that surrounds the first region and that is a region different from the first region, in which in a case where terahertz waves having a wavelength of 0.3 mm, a wavelength of 1 mm, and a wavelength of 3 mm are incident, assuming that a wavelength having a highest light concentration efficiency is a wavelength X, a transmittance of the terahertz waves having the wavelength X in the first region is a transmittance T1, and a transmittance of the terahertz waves having the wavelength X in the second region is a transmittance T2, the transmittance T2 is lower than the transmittance T1.

[2] In the metalens according to [1], the transmittance T1 and the transmittance T2 satisfy "the transmittance T2/the transmittance T1<0.5".

[3] In the metalens according to [1] or [2], the transmittance T2 is 10% or less.

[4] In the metalens according to [3], the transmittance T2 is 0%.

[5] In the metalens according to any one of [1] to [4], assuming that a diameter of the first region is R1 [mm], the R1 and the wavelength X satisfy "R1/X<25".

According to the present invention, in the metalens, it is possible to concentrate and collimate terahertz waves having a high light concentration efficiency.

DESCRIPTION OF THE PREFERRED EMBODIMENTS

Hereinafter, a metalens according to the embodiment of the present invention will be described in detail on the basis of the preferable examples shown in the accompanying drawings.

In the present specification, numerical ranges represented by "to" include numerical values before and after "to" as lower limit values and upper limit values.

In the present specification, the meaning of "the same" includes a case where an error range is generally allowable in the technical field.

The drawings shown below are all conceptual diagrams for describing the metalens according to the embodiment of the present invention. Accordingly, a shape, a size, a positional relationship, and the like of each member do not necessarily match an actual shape, an actual size, an actual positional relationship, and the like.

Figure 1:
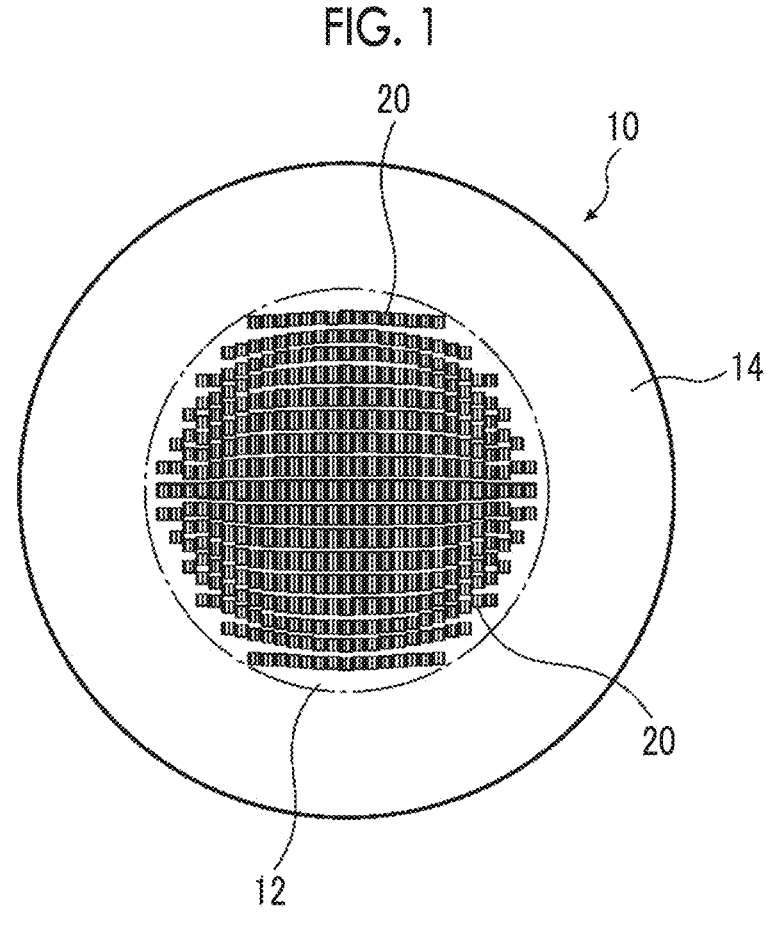
FIG. 1 is a front view conceptually showing an example of a metalens according to an embodiment of the present invention.
Figure 2:
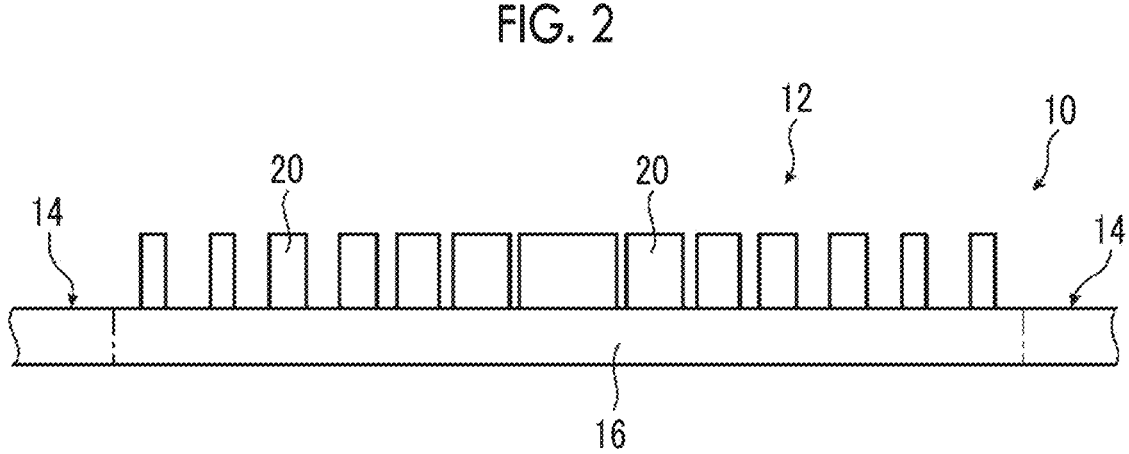
FIG. 2 is a side view conceptually showing the example of the metalens according to the embodiment of the present invention.

FIGS. 1 and 2 conceptually show an example of a metalens according to the embodiment of the present invention.

In addition, FIG. 1 is a front view of the metalens 10, and FIG. 2 is a side view of the metalens 10. The front view is a view in which the metalens is viewed from an incident direction of light, that is, an optical axis direction, and the side view is a view in which the metalens is viewed from a direction orthogonal to the front view. Further, in the following description, a shape of each portion in the front view is also referred to as a "planar shape".

As shown in FIG. 1, a metalens 10 according to the embodiment of the present invention includes a first region 12 and a second region 14.

The first region 12 is a region in which a plurality of microstructures 20 are disposed to diffract and concentrate terahertz waves. On the other hand, the second region 14 is a region surrounding the first region 12 and is a region different from the first region 12.

The metalens 10 in an example shown in the drawing is configured to include a first region 12 in which the plurality of microstructures 20 are disposed (arranged) in a central portion of a surface of one substrate 16 and the second region 14 outside the first region 12 on the substrate 16.

It should be noted that in FIGS. 1 and 2, in order to clarify a configuration of the metalens 10 according to the embodiment of the present invention, a one-dot chain line in the substrate 16 indicates a boundary between the first region 12 and the second region 14.

Here, in the metalens 10 according to the embodiment of the present invention, the boundary between the first region 12 and the second region 14 may be clearly visible in some cases, depending on the configuration of the second region 14 and the like. However, in the metalens 10 according to the embodiment of the present invention, the boundary between the first region 12 and the second region 14 is not necessarily clearly shown on the substrate 16.

Figure 3:
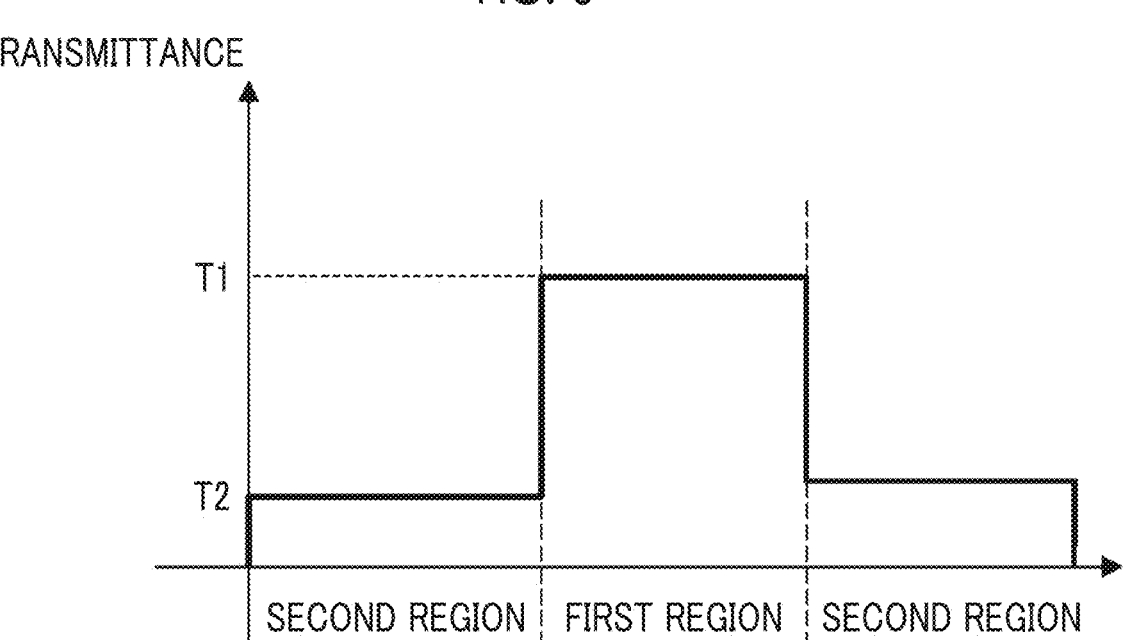
FIG. 3 is a graph conceptually showing a transmittance of the metalens according to the embodiment of the present invention.

In the metalens 10 according to the embodiment of the present invention, in a case where terahertz waves having a wavelength of 0.3 mm, terahertz waves having a wavelength of 1 mm, and terahertz waves having a wavelength of 3 mm are incident, the wavelength having the highest light concentration efficiency is set as a wavelength X, and in a case where the transmittances of the terahertz waves having the wavelength X in the first region 12 and the second region 14 are respectively set as a transmittance T1 and a transmittance T2, as conceptually shown in FIG. 3, the transmittance T2 is lower than the transmittance T1.

The metalens 10 according to the embodiment of the present invention has the above-mentioned configuration. Therefore, the metalens 10 is able to concentrate the terahertz waves having a high light concentration efficiency in a case where the terahertz waves are incident.

It should be noted that in the present invention, the terahertz waves are electromagnetic waves having a frequency of 0.1 to 10 THz, that is, electromagnetic waves having a wavelength of 0.3 to 3 mm.

In the metalens 10 according to the embodiment of the present invention, the substrate 16 is not limited, and various known sheet-like materials (films, plate-like materials, and layers) can be used as long as the microstructures 20 can be supported and the terahertz waves can be transmitted in the first region 12.

As the substrate 16, various sheet-like materials formed of a material having a high transmittance of terahertz waves can be used. Examples thereof include a sheet-like material consisting of a resin material such as a cycloolefin polymer (COP) or a polyimide, and a sheet-like material consisting of an inorganic material such as glass or silicon.

Among the materials, the substrate 16 made of COP having a high transmittance of terahertz waves is preferably used.

A thickness of the substrate 16 is not limited, and the thickness, at which the microstructures 20 can be supported and a sufficient transmittance of the terahertz waves in the first region 12 can be ensured, may be appropriately set in accordance with the material for forming the substrate 16.

In the metalens 10 according to the embodiment of the present invention, the first region 12 is a region in which the plurality of microstructures 20 are disposed to diffract and concentrate terahertz waves. In other words, the first region 12 is a region in which a refractive index, that is, a rate of change in phase to be given to the transmitted terahertz waves gradually changes from the center toward the outside.

Specifically, as illustrated by a one-dot chain line in FIG. 1, the first region 12 is a region of a minimum circle that is inscribed in a group of the microstructures 20 having a function of diffracting and concentrating the terahertz waves. That is, in the metalens 10 according to the embodiment of the present invention, the planar shape of the first region 12 is circular.

In the metalens 10 according to the embodiment of the present invention, the first region 12 is basically the same as a known metalens, that is, a light concentrating element using a metasurface structure, and refracts (diffracts) transmitted light by phase modulation to concentrate the light.

That is, the first region 12 is formed by two-dimensionally arranging the microstructures 20 at a distance on the substrate 16, and is basically constituted by an array of unit cells each formed by one microstructure 20 and a space around the microstructure 20. As in the case of a known metalens, the first region 12 modulates a phase of transmitted light by utilizing resonance by the microstructures 20, refracts the light according to the Huygens' principle of phase modulation, and concentrates the light by arranging the unit cells.

In the following description, the microstructures 20 are also referred to as resonators 20.

As described above, the first region 12 is basically a metalens using a known metasurface structure (metamaterial). Accordingly, a shape and a material for formation of the resonators 20, the arrangement of the resonators 20, the distance (pitch) between the resonators 20, and the like are not limited.

That is, the first region 12 may be designed by a known method according to the desired light concentration characteristics.

As the first region 12, for example, a structure in which the unit cells are disposed is adopted such that the phase distribution of the transmitted waves satisfies the following expression.

$$\varphi(r) = 2\pi/\lambda \times \left[ \left( r^2 + F^2 \right)^{1/2} - F \right] + \varphi_0$$

It should be noted that in the expression, $\lambda$ is a wavelength of the incident terahertz waves, r is a distance from the center of the lens, F is a designed focal position, and $\varphi_0$ is a transmission phase of the lens center.

Examples of the structure that can be used in the first region 12 include a metal pattern structure described in Optics Express, Vol. 29, No. 12, 7 Jun. 2021, pp. 18988, and the dielectric pattern structure described in Optics Express, Vol. 26, No. 23, 12 Nov. 2018, pp. 29817.

Further, an amplitude and a phase of the waves transmitted through the resonators 20 to be used may be calculated using commercially available simulation software, and the arrangement of the resonators 20 may be set so as to obtain a desired distribution of the amounts of phase modulation (refraction).

It should be noted that in the metalens 10 according to the embodiment of the present invention, the number of the resonators 20 included in one unit cell is basically one, but the present invention is not limited thereto. That is, in the metalens 10 according to the embodiment of the present invention, one unit cell may have a plurality of the resonators 20 as necessary, depending on the desired optical characteristics, the sizes and shapes of the resonators 20, the material and shape of the formation, the size of the unit cell, and the like.

However, in a case where one unit cell includes the plurality of the resonators 20, the amounts of phase modulation of the resonators in the space where the resonators are present are basically the same.

As described above, in the metalens 10 according to the embodiment of the present invention, the material for forming the resonators 20 constituting the first region 12 is not limited, and various materials that have been used as the resonators (microstructures) in a known metalens (metasurface structure) can be used.

Examples of a material for forming the resonators 20 of the first region 12 include a metal and a dielectric substance. In a case of a metal, copper, gold, and silver are preferably exemplified from the viewpoint of low optical loss. On the other hand, in a case of a dielectric substance, silicon, titanium oxide, and germanium are preferably exemplified from the viewpoint that the refractive index is large and a large phase modulation is possible.

Similarly, the shape of the resonator 20 constituting the first region 12 is not limited, and various shapes that are used as the resonator in a known metalens (metasurface structure) can be used.

For example, examples of the shape of the resonator include: a plate shape (rectangular parallelepiped shape) as shown in FIGS. 1 and 2, a metal wire (metal thread) as described in "Metalens mounted on a resonant tunneling diode for collimated and directed terahertz waves" Takehito Suzuki et al. Vol. 29, No. 12/7 Jun. 2021/Optics Express 18988, a cylindrical shape, a three-dimensional structure having a V-like bottom surface like end parts of the rectangular parallelepipeds connected to each other as shown in JP2018-46395A, a three-dimensional structure having a cross-like bottom surface like crossed rectangular parallelepipeds, a three-dimensional structure having a substantially H-like bottom surface such as H steel, a three-dimensional structure having a substantially C-like bottom surface such as a C channel, and the like.

Further, as shown in JP2018-46395A, various shapes in which an angle formed by two rectangular parallelepipeds is adjusted can be used for a three-dimensional structure having a V-like bottom surface and a three-dimensional structure having a cross-like bottom surface.

Figure 5:
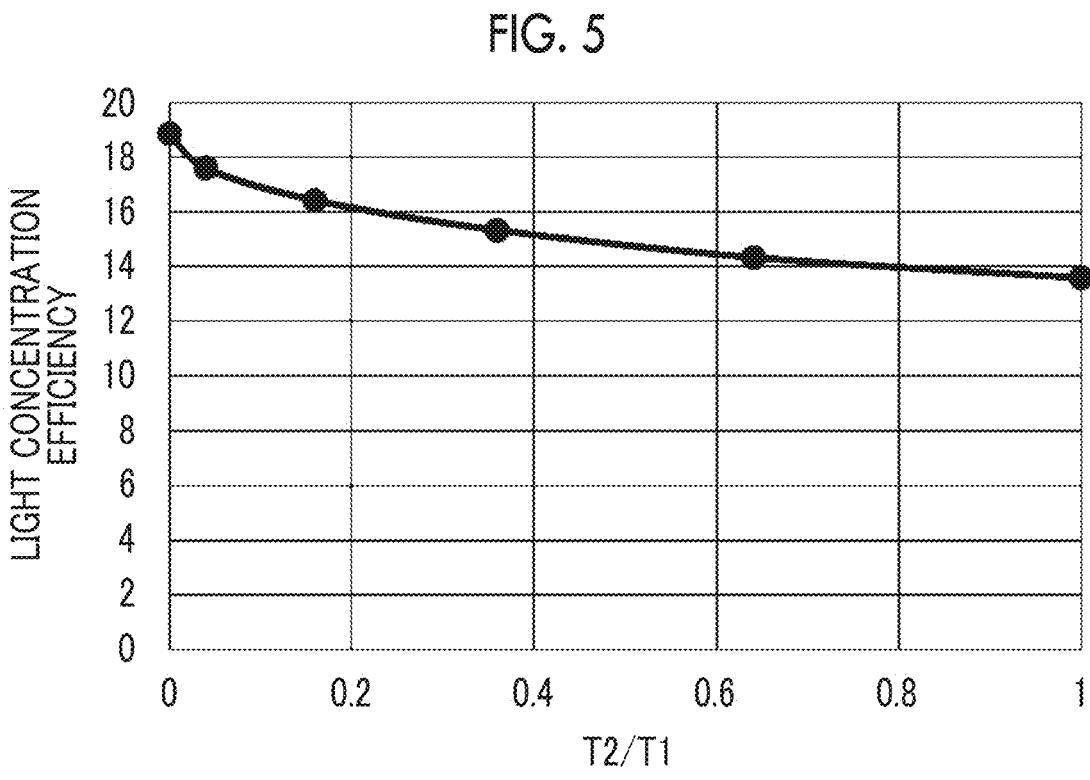
FIG. 5 is a graph showing a light concentration efficiency in an example of the present invention.

In addition to the three-dimensional structures, a three-dimensional structure having a bottom surface shape as shown in FIG. 5 of "Appl. Sci. 2018, 8(9), 1689; https://doi.org/10.3390/app8091689" can also be used.

In the first region 12, only one of the resonators 20 having these shapes may be used, or the plurality of the resonators 20 may be used in combination.

Further, the orientations of the same resonators 20 may be the same as or different from one another as shown in FIG. 1, or orientations of the same direction and orientations of different directions may be mixed.

It should be noted that in the first region 12, the structure in which the resonators 20 are disposed, that is, an arrangement structure of the resonators 20 is not limited to one layer, and may be two or more layers.

Further, the first region 12 may have a structure in which the resonators 20 are disposed on both surfaces of the substrate 16, as in the metasurface shown in "Metalens mounted on a resonant tunneling diode for collimated and directed terahertz waves" Takehito Suzuki et al. Vol. 29, No. 12/7 Jun. 2021/Optics Express 18988.

The metalens 10 according to the embodiment of the present invention has a second region 14 that surrounds the first region 12 and that is different from the first region 12.

Further, in the metalens 10 according to the embodiment of the present invention, terahertz waves having wavelengths of 0.3 mm, 1 mm, and 3 mm are incident, and the wavelength having the highest light concentration efficiency is set as a wavelength X. In such a case, as shown in FIG. 3, the transmittance T2, which is a transmittance of the terahertz waves having the wavelength X in the second region 14, is lower than the transmittance T1, which is a transmittance of the terahertz waves having the wavelength X in the first region 12.

In the following description, "the transmittance T1 which is the transmittance of the terahertz waves having the wavelength X in the first region 12" is also simply referred to as "the transmittance T1 of the first region 12". Similarly, "transmittance T2 which is the transmittance of the terahertz waves having the wavelength X in the second region 14" is also simply referred to as "transmittance T2 of the second region 14".

The metalens 10 according to the embodiment of the present invention has the above-mentioned configuration. Therefore, the metalens 10 is able to concentrate the terahertz waves having a high light concentration efficiency in a case where the terahertz waves are incident.

As described above, the metalens 10 that concentrates terahertz waves has a lower light concentration efficiency than a normal lens such as a glass lens that concentrates visible light.

In the following description, for the purpose of distinction from the metalens 10, a normal lens such as a glass lens is also referred to as an "optical lens" for convenience.

The present inventors have conducted intensive studies on the reason for this. As a result, it was found that in the metalens 10 that concentrates terahertz waves, due to circumferential incidence of the light (terahertz waves) from the periphery of the metalens 10, the light concentration efficiency is reduced.

The periphery of various lenses such as an optical lens and a metalens is usually air.

Here, at an end part of the lens, that is, at a boundary part between the lens and the air, light (electromagnetic waves) is diffracted due to various factors such as a difference in refractive index and transmittance between the lens portion and the air part, and the light travels in an inappropriate direction, which causes circumferential incidence of light.

In a case where the circumferential incidence of the light occurs, the light, which is refracted by the lens and travels appropriately, interferes with the light circumferentially incident into the lens, and the intensity of the light that is concentrated to a focal point is weakened. As a result, the light concentration efficiency is reduced.

The circumferential incidence of the light has an effect on a range of the end part of the lens to a region of several times the wavelength of the incident light.

In a case of an optical lens corresponding to visible light, the wavelength of the incidence light is short for the size of the lens. That is, in the optical lens, the lens is sufficiently large with respect to the wavelength of the light to be concentrated.

On the other hand, in the metalens 10 corresponding to the terahertz waves, the wavelength of the light to be concentrated is extremely long for the size of the lens. That is, in the metalens 10 corresponding to the terahertz waves, the lens is small with respect to the wavelength of the light to be concentrated.

For example, a wavelength of visible light is approximately 700 nm at the longest. Accordingly, even in a case where the light is circumferentially incident from the periphery of the lens to a range of several times the wavelength, the range is several μm. Therefore, for example, in a case where the lens has a diameter of 5 cm, the size of the lens with respect to the light circumferentially incident into the lens is sufficiently large, and thus the effect of the light circumferentially incident into the lens is extremely small and can be ignored.

On the other hand, the terahertz waves have a very long wavelength with respect to the visible light. For example, in a case of terahertz waves having a wavelength of 1 mm, the light that is circumferentially incident into the lens from the periphery of the lens is incident into the lens at an angle of about several mm. As a result, in a case of the same 5 cm lens as described above, the effect of the terahertz waves that are circumferentially incident from the periphery is significantly larger than that of the visible light. That is, in the metalens 10 corresponding to the terahertz waves, the structure that diffracts light is small with respect to the wavelength. Thus, the effect of the terahertz waves that are circumferentially incident from the periphery of the lens is extremely large.

As a result, in the metalens 10 corresponding to the terahertz waves, the terahertz waves that are circumferentially incident from the periphery of the lens interfere with the terahertz waves that are refracted by the lens and travels appropriately, and the component that is appropriately concentrated is reduced. As a result, the light concentration efficiency is reduced.

The present invention has been made by finding such knowledge, and is to improve the light concentration efficiency by focusing on the transmittance of the terahertz waves at the periphery of the metalens 10 and reducing the transmittance of the terahertz waves at the periphery of the metalens 10 to be lower than the transmittance of the metalens 10.

That is, as described above, the metalens 10 according to the embodiment of the present invention has the second region 14 surrounding the first region 12, which functions as a metalens, and is different from the first region 12, and further, the transmittance T2 of the second region 14 surrounding the first region 12 is lower than the transmittance T1 of the first region 12.

In other words, in the metalens 10 according to the embodiment of the present invention, the transmittance of the target terahertz waves is lower in the second region 14, which is the region surrounding the first region 12, than in the first region 12 which functions as the metalens.

The metalens 10 according to the embodiment of the present invention has such a configuration. Therefore, the terahertz waves incident on the periphery of the first region 12 that functions as the metalens are attenuated or preferably blocked by the second region 14 which has a lower transmittance than the first region 12 and which surrounds the first region 12.

Therefore, according to the metalens 10 according to the embodiment of the present invention, it is possible to reduce the terahertz waves that are circumferentially incident from the periphery of the first region 12 and to reduce the adverse effect on the terahertz waves that are refracted (diffracted) by the first region 12 and travels appropriately. As a result, by using the metalens 10 according to the embodiment of the present invention, it is possible to concentrate the terahertz waves having a high light concentration efficiency in a case where the terahertz waves are incident.

It should be noted that in the present invention, the light concentration efficiency of the lens refers to a ratio of a maximum value of an electric field intensity at a light concentration point formed behind the lens to an electric field intensity of plane waves in a case where the plane waves are incident on the lens.

Specifically, the light concentration efficiency of the metalens 10 is measured as follows using an imaging detector capable of measuring light of terahertz waves as a target.

First, the imaging detector is disposed at the light concentration point formed behind the metalens 10.

Thereafter, the terahertz waves are made to be incident on the imaging detector through the metalens 10, and the maximum value of the electric field intensity at the light concentration point is measured. Further, the metalens 10 is removed, the intensities of the incident plane waves are measured at the same position as described above with the imaging detector, an average value thereof is calculated, and a ratio of the maximum value of the electric field intensity at the light concentration point to the average value is calculated.

On the other hand, in the present invention, the transmittance T1 of the first region 12 refers to a ratio of the intensity of the plane waves incident on the first region 12 to the intensity of the electromagnetic waves transmitted through the first region 12. The transmittance T1 of the first region 12 is a transmittance including the resonators 20.

Further, the transmittance T2 of the second region 14 refers to a ratio of the intensity of the plane waves incident on the second region 14 to the intensity of the electromagnetic waves transmitted through the second region 14.

Specifically, the transmittance T1 of the first region 12 and the transmittance T2 of the second region 14 are measured as follows using an imaging detector capable of measuring the light of the target terahertz waves.

First, the metalens 10 is disposed immediately before the imaging detector.

Thereafter, the terahertz waves are incident on the imaging detector via the metalens 10, the intensities of the electromagnetic waves detected by the pixels corresponding to the first region 12 or the second region 14 are measured, and an average value thereof is measured. This average value is set as a transmission intensity.

Further, the metalens 10 is removed, the intensities of the incident plane waves are measured at the same position as described above using the imaging detector, and an average value thereof is calculated. The average value is set as an intensity of incident plane waves.

Further, a ratio of the measured transmission intensity to the incidence plane waves intensity "(transmission intensity/incidence plane waves intensity)×100)" is calculated to obtain the transmittances in the first region 12 and the second region 14.

In the metalens 10 according to the embodiment of the present invention, the transmittance T2 of the second region 14 is lower than the transmittance T1 of the first region 12.

Here, in the present invention, the larger the difference between the transmittance T2 and the transmittance T1, the greater the effect of improving the light concentration efficiency.

In consideration of this point, it is preferable that the metalens 10 satisfies a relationship of "transmittance T2/transmittance T1<0.5" between the transmittance T2 of the second region 14 and the transmittance T1 of the first region 12.

It is preferable that the ratio of the transmittance T2 to the transmittance T1 is less than 0.5 in the following points. The terahertz waves circumferentially incident from the periphery of the first region 12 can be sufficiently attenuated, and thus the effect of improving the light concentration efficiency can be suitably obtained.

It should be noted that the ratio of the transmittance T2 to the transmittance T1 is more preferably less than 0.3, still more preferably less than 0.1, and most preferably 0. That is, in the embodiment of the present invention, the transmittance T2 in the second region 14 is most preferably 0%.

The transmittance T2 of the second region 14 may be lower than the transmittance T1 of the first region 12.

In a case where this condition is satisfied, the transmittance T2 of the second region 14 is not limited, but the transmittance T2 is preferably 10% or less.

It is preferable that the transmittance T2 is set to be 10% or less in the following points. The terahertz waves circumferentially incident from the periphery of the first region 12 can be sufficiently reduced and thus the effect of improving the light concentration efficiency can be suitably obtained.

It should be noted that the transmittance T2 is more preferably 5% or less and still more preferably 3% or less, and as described above, is most preferably 0%.

According to the studies conducted by the present inventors, in the metalens 10 according to the embodiment of the present invention, the larger the size of the first region 12 with respect to the wavelength of the target terahertz waves, the better the effect of improving the light concentration efficiency can be obtained.

However, in the metalens 10 according to the embodiment of the present invention, it is preferable that the above-mentioned wavelength X [mm] and the diameter R1 [mm] of the first region 12 satisfy "R1/X<25".

It is preferable that the metalens 10 satisfies this condition from the viewpoint that an effect of improving the light concentration efficiency by increasing the difference between the transmittance T1 and the transmittance T2 can be obtained.

In the case of the metalens 10 according to the embodiment of the present invention, it is more preferable to satisfy the expression of "R1/X<20", and it is yet more preferable to satisfy the expression of "R1/X<15".

In the metalens 10 according to the embodiment of the present invention, the size of the second region 14 is not limited, and the second region 14 may be provided to surround the first region 12.

Here, the circumferential incidence of the terahertz waves from the periphery of the first region 12, which causes the decrease in the light concentration efficiency, is the largest in the vicinity of the first region 12. Further, the circumferential incidence of the terahertz waves from the periphery of the first region 12 is reduced as the distance from the first region 12 is increased, and the circumferential incidence of the terahertz waves from a position separated by a certain distance does not affect the light concentration efficiency.

In consideration of this point, the size of the second region 14 is a size corresponding to a circle having the same center as the first region 12. The size is preferably in a range of about 2 to 10 times and more preferably in a range of about 2 to 5 times the diameter R1 of the first region 12.

As described above, in the metalens 10 according to the embodiment of the present invention, the first region 12 is a region of the minimum circle that is inscribed in the group of the resonators 20 (microstructures 20) having a function of diffracting and concentrating the terahertz waves, as indicated by a one-dot chain line in FIG. 1. That is, in the metalens 10 according to the embodiment of the present invention, the first region 12 functioning as the metalens has a circular planar shape.

Here, in the metalens 10 shown in FIG. 1, a planar shape (appearance) of the second region 14 surrounding the first region 12 is also a circle. That is, the planar shape of the second region 14 is an annular shape.

However, the present invention is not limited thereto. In a case where the second region surrounds the first region, various shapes such as polygons including a quadrangle and a hexagon, an ellipse, and an indefinite shape can be used as a planar shape of the appearance of the second region.

The second region 14 can be formed by various well-known methods in a case where the transmittance T2 is lower than the transmittance T1 of the first region 12.

It should be noted that the reduction of the transmittance of the terahertz waves in the second region 14, preferably the blocking thereof may be performed by absorption or may be performed by reflection.

For example, as in the metalens 10 shown in FIG. 1, the first region 12 may be formed by disposing the resonators 20 on the surface of the substrate 16 and the region of the substrate 16 around the first region 12 may be set as the second region 14. In such a case, a method of forming a film that absorbs or reflects terahertz waves on the surface of the substrate 16 corresponding to the second region 14 is exemplified. Preferably, a method of forming a film, which blocks terahertz waves through absorption or reflection, on the surface of the substrate 16 corresponding to the second region 14 is exemplified.

As the film that absorbs or reflects the terahertz waves, it is possible to use various known films, such as a film consisting of a resin material, a metal film, and a film consisting of a magnetic material, as long as the films absorb or reflect the terahertz waves.

A film that absorbs or reflects terahertz waves may be formed by a known method such as coating with a coating material, film formation by a gas phase film forming method such as vacuum deposition and chemical vapor deposition (CVD), and plating according to the material to be formed.

As another method, a method of changing a formation material of the substrate 16 between the first region 12 and the second region 14 is exemplified.

That is, in the first region 12, the substrate having a high transmittance of the terahertz waves is used, and the second region 14 formed of the substrate (sheet-like material) having a low transmittance of the terahertz waves is formed around the substrate. Thereby, the transmittance T2 of the second region 14 is lower than the transmittance T1 of the first region 12.

The transmittance T2 of the second region 14 is preferably uniform, but may be non-uniform.

As described above, the amount of light circumferentially incident from the periphery of the first region 12 is the largest in the vicinity of the first region 12 and is the smallest as the distance from the first region 12 increases.

In consideration of this point, the transmittance T2 of the second region 14 may be non-uniform. In such a case, it is preferable that the transmittance T2 is the lowest in the vicinity of the first region 12 and increases as the distance from the first region 12 increases.

In the metalens 10 in the example shown in the drawing, the resonators 20 are provided only in the first region 12, but the present invention is not limited thereto.

That is, the metalens 10 according to the embodiment of the present invention may have the resonators 20 in the second region 14 as necessary. However, the second region 14 may have the resonators 20. In such a case, the plurality of disposed resonators 20, that is, the unit cells do not diffract the terahertz waves, that is, do not have a function of concentrating the terahertz waves.

Hereinbefore, the metalens 10 according to the embodiment of the present invention has been described in detail. However, the present invention is not limited to the above-mentioned examples. Various improvements or modifications may be made without departing from the scope of the present invention.

EXAMPLES

Hereinafter, characteristics of the present invention will be described in further detail with reference to examples.

It should be noted that the following examples each show an example of the present invention. Accordingly, the scope of the present invention should not be construed as being limited by the specific examples given below.

Example A

A metalens was designed such that the first region having a circular shape is surrounded by the second region having an annular shape as shown in FIG. 1, where the diameter R1 of the first region is 31 mm and the diameter R2 of the second region is 62 mm.

In the first region, the unit cells were disposed such that the phase distribution of the transmitted waves was represented by the following expression.

$$\varphi(r) = 2\pi/\lambda \times [(r^2 + F^2)^{(1/2)} - F] + \varphi_0$$

In the expression, $\lambda$ is a wavelength of the incident terahertz waves, r is a distance from the center of the lens, F is a designed focal position, and $\varphi_0$ is a transmission phase at the lens center.

In the present example, $\lambda$ is a wavelength at which the light concentration efficiency is the highest, and was designed as a wavelength of 3 mm. That is, terahertz waves having a frequency of 0.1 THz at a wavelength X of 3 mm is assumed.

A designed focal length F was set to 50 mm.

By changing the transmittance T1 of the first region and the transmittance T2 of the second region into various values, the metalenses according to Examples A1 to A5 and Comparative Example A1 were produced.

The transmittance T1 and the transmittance T2 were calculated by simulation on the basis of the ratio of the electric field intensity of the incident plane waves immediately after transmission through the lens to the intensity of the electromagnetic waves.

It should be noted that in the following table, the transmittance T1 of the first region and the transmittance T2 of the second region represent transmittances standardized by setting the transmittance T1 of the first region to "1". It should be noted that the transmittance T1 of the first region is 90%.

For each of the designed metalenses, the light concentration efficiency (the maximum electric field intensity) at the light concentration point was evaluated through simulation using a Fourier transform beam propagation method (FFT-BPM method).

Figure 4:
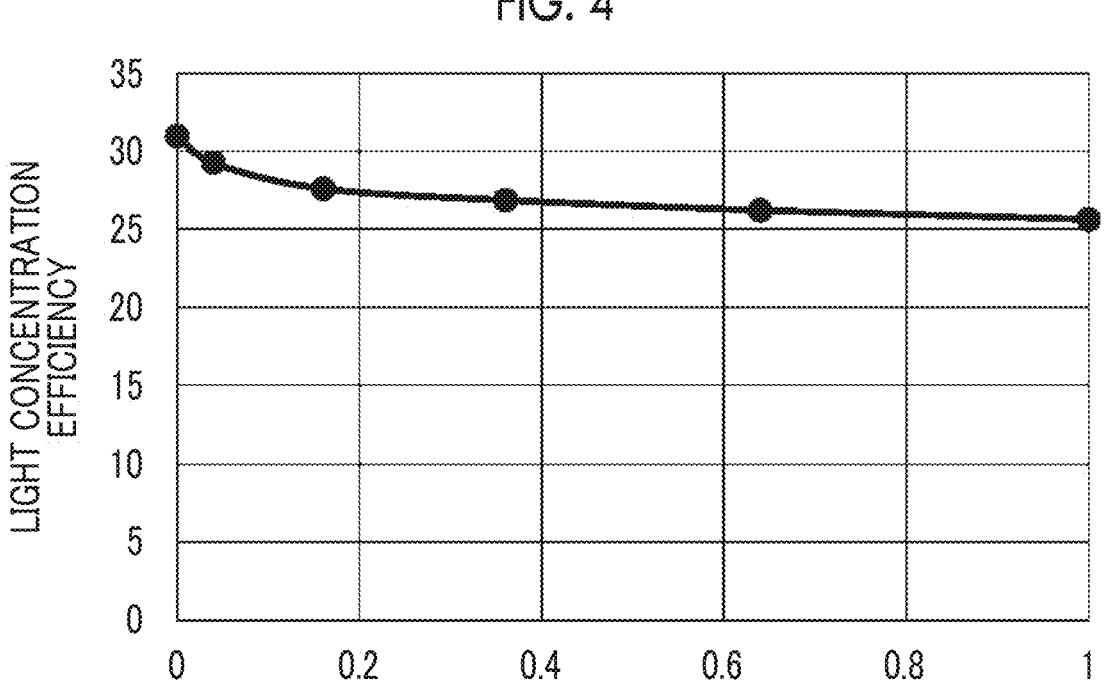
FIG. 4 is a graph showing a light concentration efficiency in an example of the present invention.

The results are shown in Table 1 and FIG. 4 below.

TABLE 1

| | T1 | T2 | T2/T1 | X (mm) | F (mm) | R1 (mm) | R2 (mm) | R1/X | Light Concentration Efficiency |
|---|---|---|---|---|---|---|---|---|---|
| Example A1 | 1 | 0 | 0 | 3 | 50 | 31 | 62 | 10.3 | 30.96578 |
| Example A2 | 1 | 0.04 | 0.04 | 3 | 50 | 31 | 62 | 10.3 | 29.24516 |
| Example A3 | 1 | 0.16 | 0.16 | 3 | 50 | 31 | 62 | 10.3 | 27.59207 |
| Example A4 | 1 | 0.36 | 0.36 | 3 | 50 | 31 | 62 | 10.3 | 26.86033 |
| Example A5 | 1 | 0.64 | 0.64 | 3 | 50 | 31 | 62 | 10.3 | 26.21552 |
| Comparative Example A1 | 1 | 1 | 1 | 3 | 50 | 31 | 62 | 10.3 | 25.62903 |

Example B

Metalenses of Examples B1 to B5 and Comparative Example B1 were produced and the light concentration efficiency thereof was evaluated in the same manner as in Example A, except that the focal length F was set to 75 mm.

The results are shown in Table 2 and FIG. 5 below.

TABLE 2

|  | T1 | T2 | T2/T1 | X [mm] | F [mm] | R1 [mm] | R2 [mm] | R1/X | Light Concentration Efficiency |
|---|---|---|---|---|---|---|---|---|---|
| Example B1 | 1 | 0 | 0 | 3 | 75 | 31 | 62 | 10.3 | 18.8802 |
| Example B2 | 1 | 0.04 | 0.04 | 3 | 75 | 31 | 62 | 10.3 | 17.60724 |
| Example B3 | 1 | 0.16 | 0.16 | 3 | 75 | 31 | 62 | 10.3 | 16.42558 |
| Example B4 | 1 | 0.36 | 0.36 | 3 | 75 | 31 | 62 | 10.3 | 15.33519 |
| Example B5 | 1 | 0.64 | 0.64 | 3 | 75 | 31 | 62 | 10.3 | 14.33608 |
| Comparative Example B1 | 1 | 1 | 1 | 3 | 75 | 31 | 62 | 10.3 | 13.58152 |

Example C

Metalenses of Examples C1 to C5 and Comparative Example C1 were produced and the light concentration efficiency thereof was evaluated in the same manner as in Example A, except that the focal length F was set to 100 mm.

Figure 6:
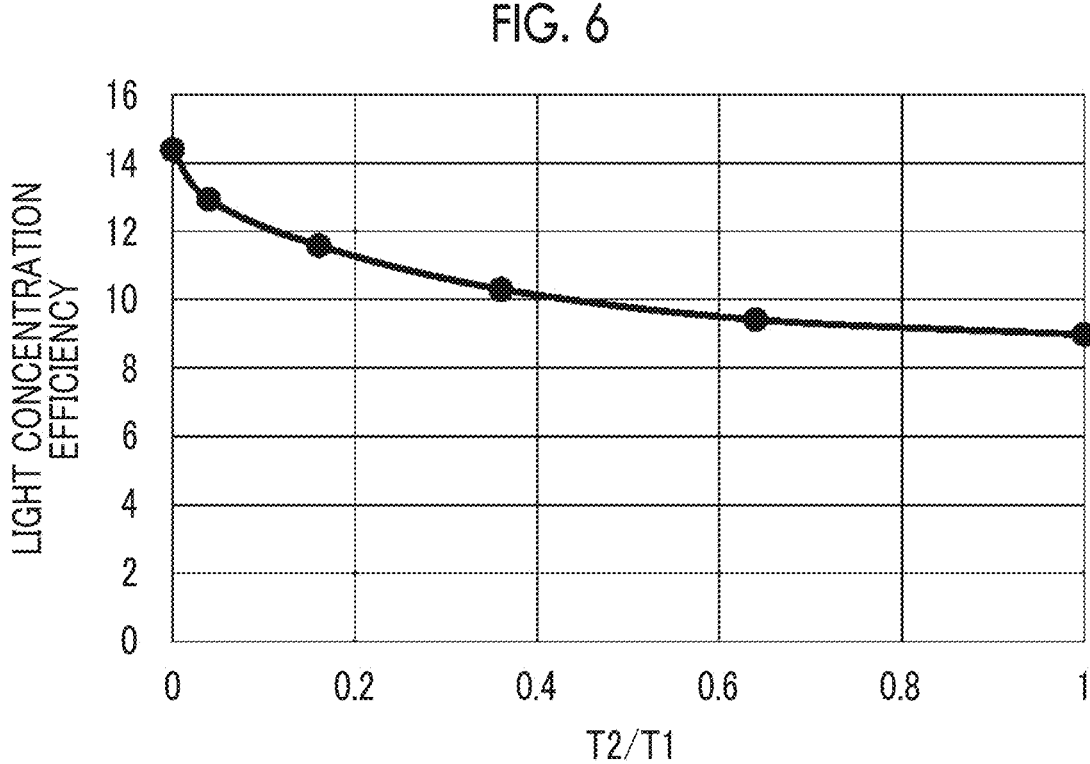
FIG. 6 is a graph showing a light concentration efficiency in an example of the present invention.

The results are shown in Table 3 and FIG. 6 below.

TABLE 3

|  | T1 | T2 | T2/T1 | X [mm] | F [mm] | R1 [mm] | R2 [mm] | R1/X | Light Concentration Efficiency |
|---|---|---|---|---|---|---|---|---|---|
| Example C1 | 1 | 0 | 0 | 3 | 100 | 31 | 62 | 10.3 | 14.40507 |
| Example C2 | 1 | 0.04 | 0.04 | 3 | 100 | 31 | 62 | 10.3 | 12.94666 |
| Example C3 | 1 | 0.16 | 0.16 | 3 | 100 | 31 | 62 | 10.3 | 11.57953 |
| Example C4 | 1 | 0.36 | 0.36 | 3 | 100 | 31 | 62 | 10.3 | 10.30368 |
| Example C5 | 1 | 0.64 | 0.64 | 3 | 100 | 31 | 62 | 10.3 | 9.411181 |
| Comparative Example C1 | 1 | 1 | 1 | 3 | 100 | 31 | 62 | 10.3 | 8.970302 |

Example D

Metalenses of Examples D1 to D5 and Comparative Example D1 were produced and the light concentration efficiency was evaluated in the same manner as in Example A, except that the focal length F was set to 150 mm.

Figure 7:
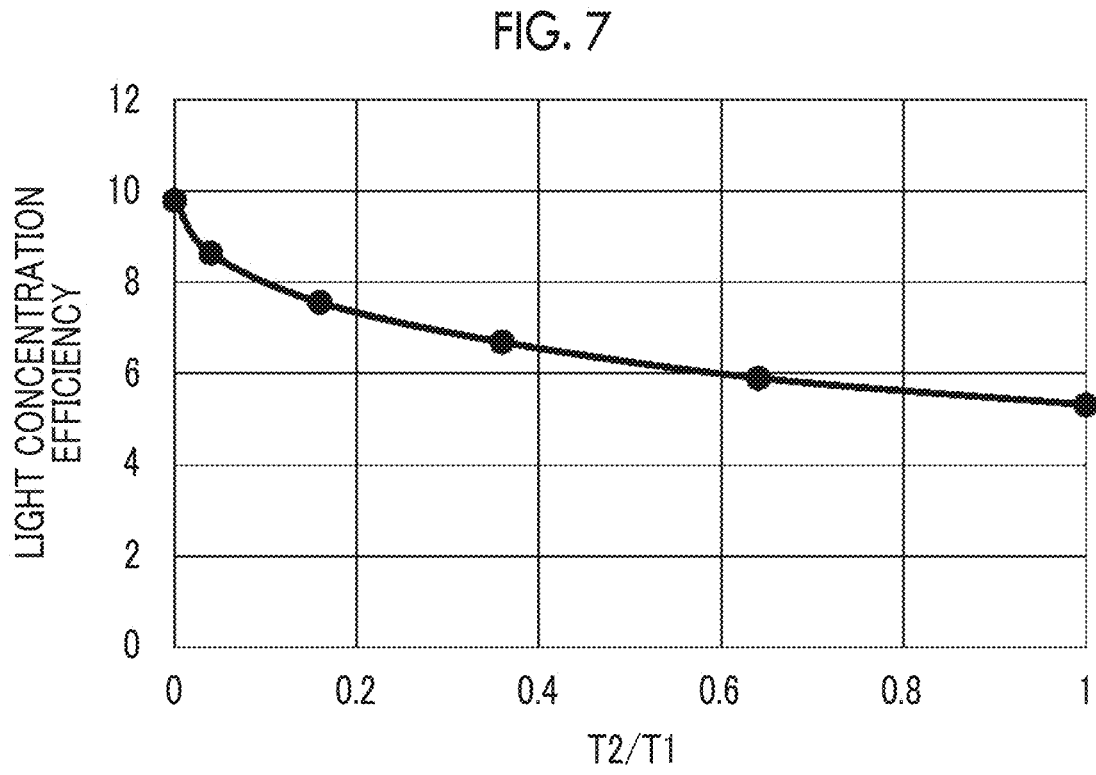
FIG. 7 is a graph showing a light concentration efficiency in an example of the present invention.

The results are shown in Table 4 and FIG. 7 below.

TABLE 4

|  | T1 | T2 | T2/T1 | X [mm] | F [mm] | R1 [mm] | R2 [mm] | R1/X | Light Concentration Efficiency |
|---|---|---|---|---|---|---|---|---|---|
| Example D1 | 1 | 0 | 0 | 3 | 150 | 31 | 62 | 10.3 | 9.799661 |
| Example D2 | 1 | 0.04 | 0.04 | 3 | 150 | 31 | 62 | 10.3 | 8.632566 |
| Example D3 | 1 | 0.16 | 0.16 | 3 | 150 | 31 | 62 | 10.3 | 7.551844 |
| Example D4 | 1 | 0.36 | 0.36 | 3 | 150 | 31 | 62 | 10.3 | 6.678055 |
| Example D5 | 1 | 0.64 | 0.64 | 3 | 150 | 31 | 62 | 10.3 | 5.88904 |
| Comparative Example D1 | 1 | 1 | 1 | 3 | 150 | 31 | 62 | 10.3 | 5.30103 |

US 12,620,686 B2

15

16

Example E

Metalenses of Examples E1 to E5 and Comparative Example E1 were produced and the light concentration efficiency was evaluated in the same manner as in Example A, except that the diameter R1 of the first region was set to 41 mm, the diameter R2 of the second region was set to 82 mm, and the focal length F was set to 150 mm.

Figure 8:
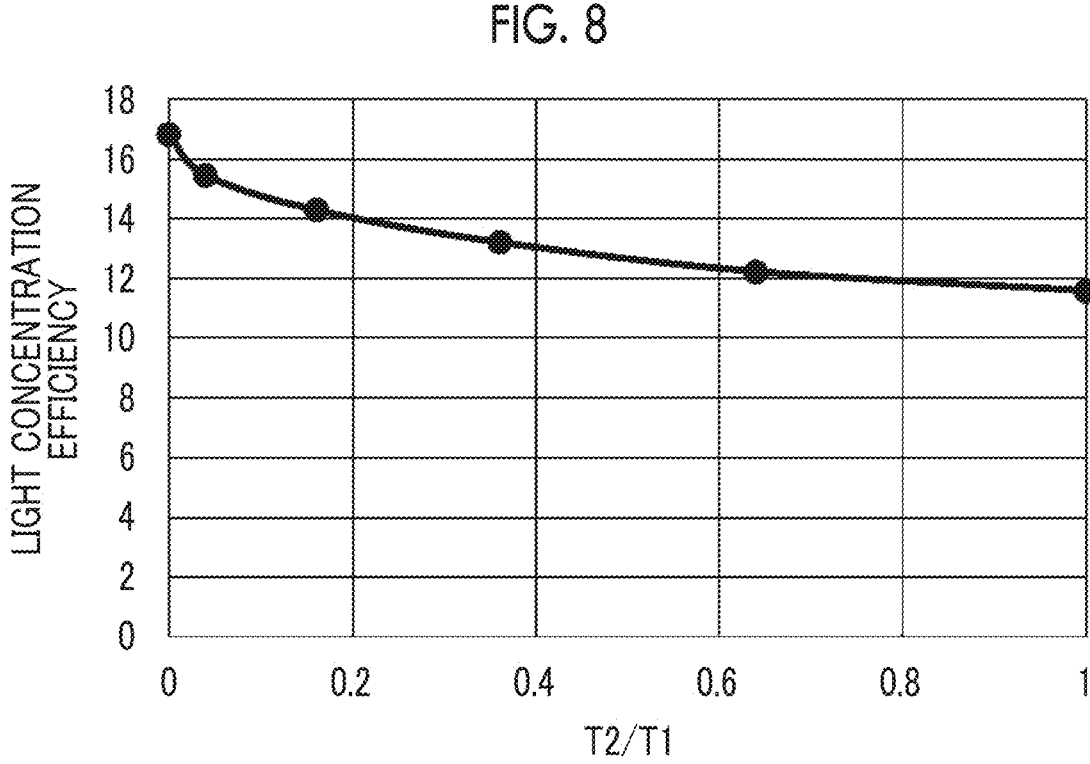
FIG. 8 is a graph showing a light concentration efficiency in an example of the present invention.

The results are shown in Table 5 and FIG. 8 below.

TABLE 5

|  | T1 | T2 | T2/T1 | X [mm] | F [mm] | R1 [mm] | R2 [mm] | R1/X | Light Concentration Efficiency |
|---|---|---|---|---|---|---|---|---|---|
| Example E1 | 1 | 0 | 0 | 3 | 150 | 41 | 82 | 13.7 | 16.8297 |
| Example E2 | 1 | 0.04 | 0.04 | 3 | 150 | 41 | 82 | 13.7 | 15.47279 |
| Example E3 | 1 | 0.16 | 0.16 | 3 | 150 | 41 | 82 | 13.7 | 14.29119 |
| Example E4 | 1 | 0.36 | 0.36 | 3 | 150 | 41 | 82 | 13.7 | 13.20945 |
| Example E5 | 1 | 0.64 | 0.64 | 3 | 150 | 41 | 82 | 13.7 | 12.22755 |
| Comparative Example E1 | 1 | 1 | 1 | 3 | 150 | 41 | 82 | 13.7 | 11.58363 |

Example F

Metalenses of Examples F1 to F5 and Comparative Example F1 were produced and the light concentration efficiency was evaluated in the same manner as in Example A, except that the diameter R1 of the first region was set to 52 mm, the diameter R2 of the second region was set to 104 mm, and the focal length F was set to 150 mm.

Figure 9:
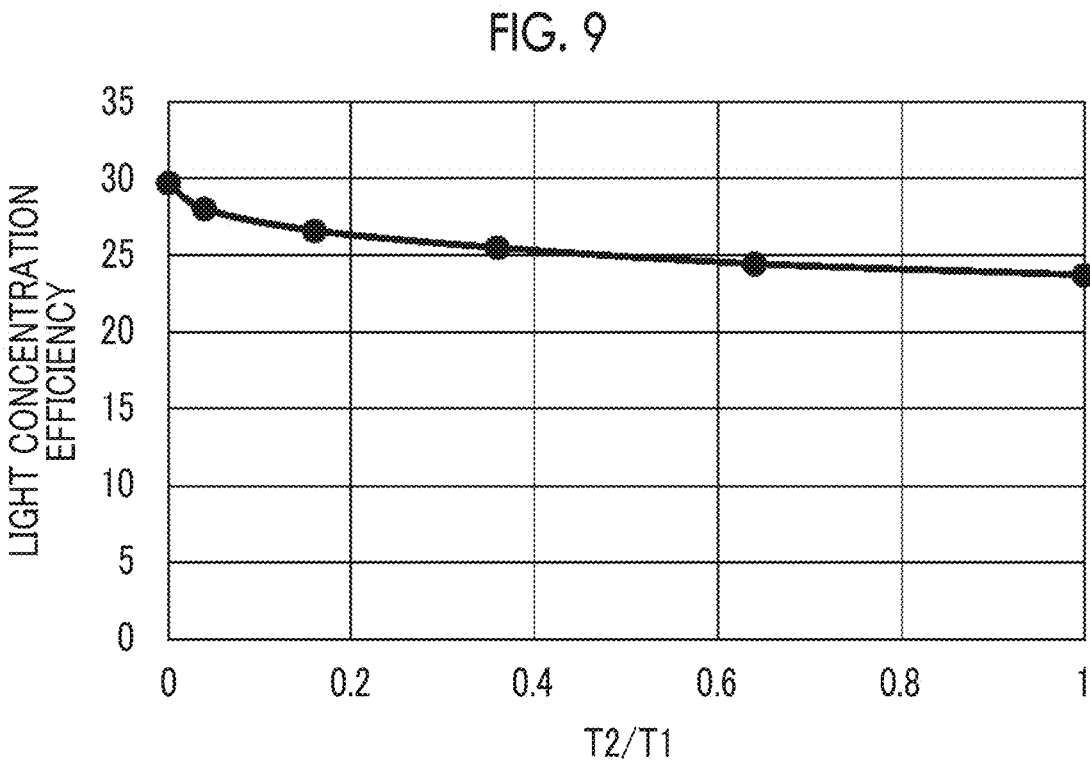
FIG. 9 is a graph showing a light concentration efficiency in an example of the present invention.

The results are shown in Table 6 and FIG. 9 below.

TABLE 6

|  | T1 | T2 | T2/T1 | X [mm] | F [mm] | R1 [mm] | R2 [mm] | R1/X | Light Concentration Efficiency |
|---|---|---|---|---|---|---|---|---|---|
| Example F1 | 1 | 0 | 0 | 3 | 150 | 52 | 104 | 17.3 | 29.75011 |
| Example F2 | 1 | 0.04 | 0.04 | 3 | 150 | 52 | 104 | 17.3 | 28.0209 |
| Example F3 | 1 | 0.16 | 0.16 | 3 | 150 | 52 | 104 | 17.3 | 26.61006 |
| Example F4 | 1 | 0.36 | 0.36 | 3 | 150 | 52 | 104 | 17.3 | 25.49366 |
| Example F5 | 1 | 0.64 | 0.64 | 3 | 150 | 52 | 104 | 17.3 | 24.44726 |
| Comparative Example F1 | 1 | 1 | 1 | 3 | 150 | 52 | 104 | 17.3 | 23.72629 |

Example G

Metalenses of Examples G1 to G5 and Comparative Example G1 were produced and the light concentration efficiency was evaluated in the same manner as in Example A, except that the diameter R1 of the first region was set to 62 mm, the diameter R2 of the second region was set to 124 mm, and the focal length F was set to 150 mm.

Figure 10:
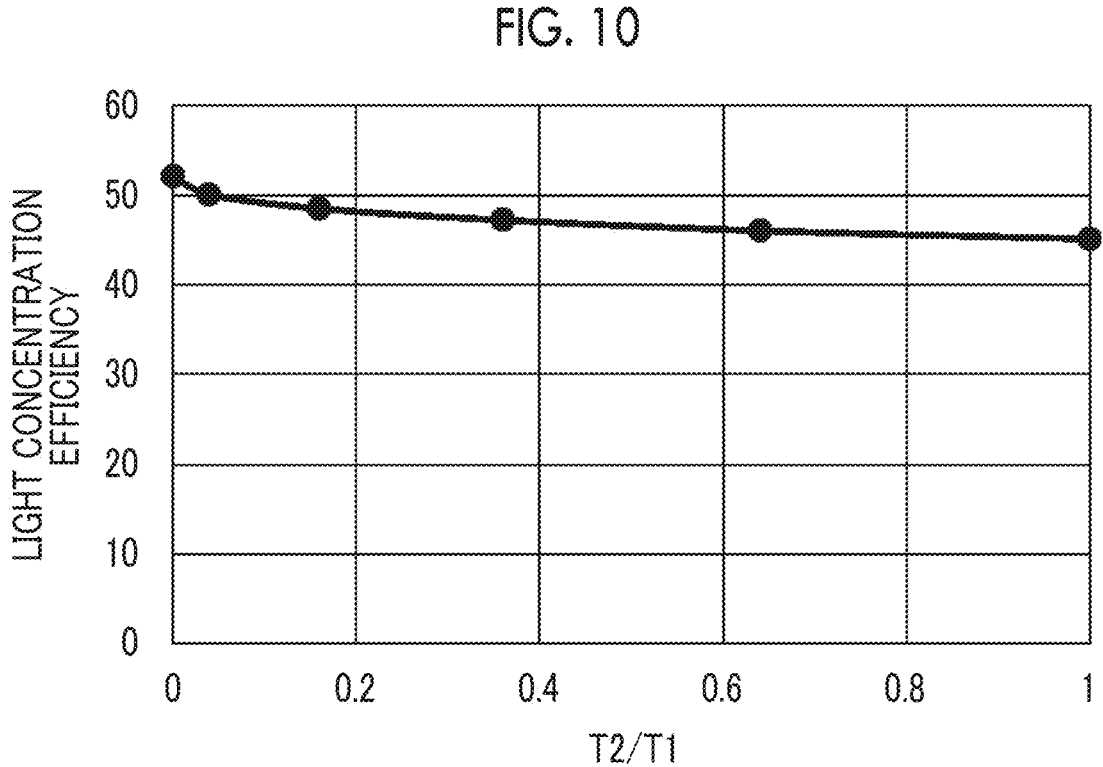
FIG. 10 is a graph showing a light concentration efficiency in an example of the present invention.

The results are shown in Table 7 and FIG. 10 below.

TABLE 7

|  | T1 | T2 | T2/T1 | X [mm] | F [mm] | R1 [mm] | R2 [mm] | R1/X | Light Concentration Efficiency |
|---|---|---|---|---|---|---|---|---|---|
| Example G1 | 1 | 0 | 0 | 3 | 150 | 62 | 124 | 20.7 | 52.14154 |
| Example C2 | 1 | 0.04 | 0.04 | 3 | 150 | 62 | 124 | 20.7 | 50.06886 |
| Example G3 | 1 | 0.16 | 0.16 | 3 | 150 | 62 | 124 | 20.7 | 48.47671 |
| Example G4 | 1 | 0.36 | 0.36 | 3 | 150 | 62 | 124 | 20.7 | 47.19688 |
| Example G5 | 1 | 0.64 | 0.64 | 3 | 150 | 62 | 124 | 20.7 | 46.0094 |
| Comparative Example G1 | 1 | 1 | 1 | 3 | 150 | 62 | 124 | 20.7 | 45.07988 |

Example H

Metalenses of Examples H1 to H5 and Comparative Example H1 were produced and the light concentration efficiency was evaluated in the same manner as in Example A, except that the diameter R1 of the first region was set to 72 mm, the diameter R2 of the second region was set to 144 mm, and the focal length F was set to 150 mm.

Figure 11:
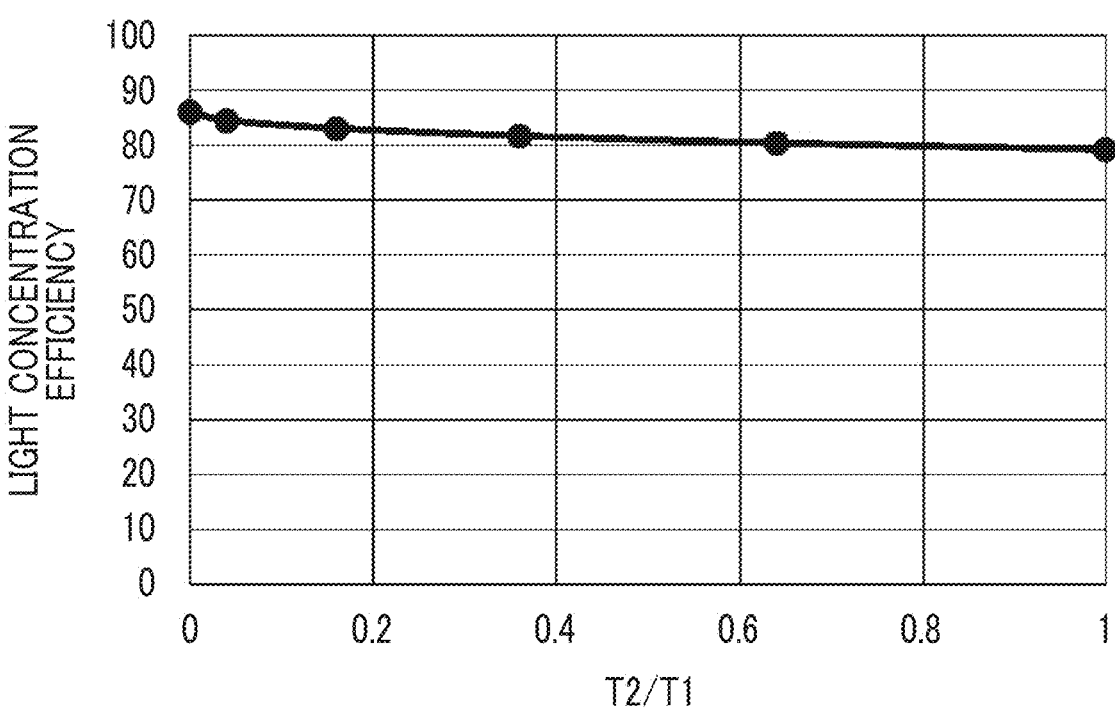
FIG. 11 is a graph showing a light concentration efficiency in an example of the present invention.

The results are shown in Table 8 and FIG. 11 below.

TABLE 8

| | T1 | T2 | T2/T1 | X [mm] | F [mm] | R1 [mm] | R2 [mm] | R1/X | Light Concentration Efficiency |
|---|---|---|---|---|---|---|---|---|---|
| Example H1 | 1 | 0 | 0 | 3 | 150 | 72 | 144 | 24.0 | 86.02471 |
| Example H2 | 1 | 0.04 | 0.04 | 3 | 150 | 72 | 144 | 24.0 | 84.50453 |
| Example H3 | 1 | 0.16 | 0.16 | 3 | 150 | 72 | 144 | 24.0 | 83.05944 |
| Example H4 | 1 | 0.36 | 0.36 | 3 | 150 | 72 | 144 | 24.0 | 81.68941 |
| Example H5 | 1 | 0.64 | 0.64 | 3 | 150 | 72 | 144 | 24.0 | 80.39446 |
| Comparative Example H1 | 1 | 1 | 1 | 3 | 150 | 72 | 144 | 24.0 | 79.17458 |

As shown in the examples and the comparative examples described above, the metalens according to the embodiment of the present invention, which has the first region acting as a metalens and the second region surrounding the first region and in which the transmittance T2 of the second region is lower than the transmittance T1 of the first region, is able to obtain a higher light concentration efficiency as compared with the metalens according to comparative examples that do not satisfy this condition.

Further, as T2/T1 is smaller, that is, as the difference between the transmittance T2 and the transmittance T1 is larger, a higher light concentration efficiency is obtained. In particular, in a region in which T2/T1 is less than 0.5, the effect of improving the light concentration efficiency is suitably obtained, and in a region in which the transmittance T2 of the second region is 10% or less, the effect of improving the light concentration efficiency is suitably obtained. As described above, the transmittance T1 of the first region is 90%. Therefore, the transmittance of the second region having a transmittance T2 of 0.11 or less is 10% or less.

Further, the larger the diameter R1 of the first region with respect to the wavelength (3 mm) of the incident terahertz waves, that is, the larger the "R1/X", the higher the light concentration efficiency. On the other hand, in a case where "R1/X" is large, it is difficult to obtain the effect of the present invention that the higher the difference between the transmittance T2 and the transmittance T1, the higher the light concentration efficiency.

From the above results, the effect of the present invention is clear.

The present invention can be suitably used for controlling communication in a next-generation communication standard and the like.

EXPLANATION OF REFERENCES

10: metalens
12: first region
14: second region
16: substrate
20: microstructure (resonator)

What is claimed is:

1. A metalens comprising:
a first region that has a plurality of microstructures disposed therein to diffract and concentrate terahertz waves; and
a second region that surrounds the first region and that is a region different from the first region,
wherein in a case where terahertz waves having a wavelength of 0.3 mm, a wavelength of 1 mm, and a wavelength of 3 mm are incident, assuming that
a wavelength having a highest light concentration efficiency is a wavelength X,
a transmittance of the terahertz waves having the wavelength X in the first region is a transmittance T1, and
a transmittance of the terahertz waves having the wavelength X in the second region is a transmittance T2,
the transmittance T2 is lower than the transmittance T1.

2. The metalens according to claim 1, wherein the transmittance T1 and the transmittance T2 satisfy "the transmittance T2/the transmittance T1<0.5".

3. The metalens according to claim 2, wherein the transmittance T2 is 10% or less.

4. The metalens according to claim 3, wherein the transmittance T2 is 0%.

5. The metalens according to claim 2, wherein assuming that a diameter of the first region is R1 [mm], the R1 and the wavelength X satisfy "R1/X<25".

6. The metalens according to claim 1, wherein the transmittance T2 is 10% or less.

7. The metalens according to claim 6, wherein the transmittance T2 is 0%.

8. The metalens according to claim 7, wherein assuming that a diameter of the first region is R1 [mm], the R1 and the wavelength X satisfy "R1/X<25".

9. The metalens according to claim 6, wherein assuming that a diameter of the first region is R1 [mm], the R1 and the wavelength X satisfy "R1/X<25".

10. The metalens according to claim 1, wherein assuming that a diameter of the first region is R1 [mm], the R1 and the wavelength X satisfy "R1/X<25".

* * * * *